(12) United States Patent
Sunwoo et al.

(10) Patent No.: US 11,989,865 B2
(45) Date of Patent: May 21, 2024

(54) APPARATUS AND METHOD FOR GENERATING HDR IMAGE

(71) Applicant: AJOU UNIVERSITY INDUSTRY-ACADEMIC COOPERATION FOUNDATION, Suwon-si (KR)

(72) Inventors: Myung Hoon Sunwoo, Seoul (KR); Byeong Dae Lee, Yongin-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 373 days.

(21) Appl. No.: 17/647,097

(22) Filed: Jan. 5, 2022

(65) Prior Publication Data
US 2022/0215516 A1    Jul. 7, 2022

(30) Foreign Application Priority Data

Jan. 6, 2021  (KR) .......................... 10-2021-0001617

(51) Int. Cl.
*G06T 5/92*   (2024.01)
*G06N 3/045*  (2023.01)
*G06T 5/50*   (2006.01)

(52) U.S. Cl.
CPC .............. *G06T 5/92* (2024.01); *G06N 3/045* (2023.01); *G06T 5/50* (2013.01);
(Continued)

(58) Field of Classification Search
CPC ... G06T 5/92; G06T 5/50; G06T 2207/20084; G06T 2207/20208; G06T 2207/20212; G06N 3/045
See application file for complete search history.

(56) References Cited

U.S. PATENT DOCUMENTS

| 2009/0034868 A1* | 2/2009 | Rempel ................ G09G 3/3426 382/274 |
| 2013/0121576 A1* | 5/2013 | Hsu ........................... G06T 5/94 382/167 |

(Continued)

FOREIGN PATENT DOCUMENTS

KR          10-1926490 B1    12/2018

OTHER PUBLICATIONS

Jung Hee Kim, et al., "End-to-End Differentiable Learning to HDR Image Synthesis for Multi-exposure Images", Electrical Engineering and Systems Science_Image and Video Processing, arXiv:2006.15833, Dec. 18, 2020, 9 pages.

(Continued)

*Primary Examiner* — Syed Haider
(74) *Attorney, Agent, or Firm* — Sughrue Mion, PLLC

(57) ABSTRACT

An apparatus for generating an HDR image includes an input image generator that generates a first image and a second image and an HDR image generator that generates a high dynamic range (HDR) in which a dynamic range of an original image is extended from the first image and the second image using a pre-trained model including a first neural network, a second neural network, and a third neural network, in which the first neural network is pre-trained to output a third image, the second neural network is pre-trained to output a fourth image and the third neural network is pre-trained to generate the HDR image based on the third image and the fourth image.

14 Claims, 5 Drawing Sheets

(52) U.S. Cl.
CPC .............. *G06T 2207/20084* (2013.01); *G06T 2207/20208* (2013.01); *G06T 2207/20212* (2013.01)

(56) References Cited

U.S. PATENT DOCUMENTS

| | | | |
|---|---|---|---|
| 2019/0208111 A1* | 7/2019 | Wendel | H04N 23/745 |
| 2020/0134787 A1* | 4/2020 | Bouzaraa | G06T 5/73 |
| 2020/0143204 A1* | 5/2020 | Nakano | G06V 10/82 |
| 2021/0150812 A1* | 5/2021 | Su | G06F 18/285 |

OTHER PUBLICATIONS

Siyeong Lee, et al., "Learning to Generate Multi-Exposure Stacks with Cycle Consistency for High Dynamic Range Imaging", IEEE Transactions on Multimedia, Aug. 3, 2020, pp. 1-14, vol. 23.

Kareem Metwaly, et al., "Attention-Mask Dense Merger (Attendense) Deep HDR for Ghost Removal", ICASSP 2020—2020 IEEE International Conference on Acoustics, Speech and Signal Processing (ICASSP), May 4-8, 2020, pp. 2623-2627.

Office Action issued from Korean Patent Application No. 10-2021-0001617 issued on Nov. 22, 2021.

\* cited by examiner

APPARATUS AND METHOD FOR GENERATING HDR IMAGE

CROSS-REFERENCE TO RELATED APPLICATION

This application claims the benefit under 35 USC § 119(a) of Korean Patent Application No. 10-2021-0001617, filed on Jan. 6, 2021, in the Korean Intellectual Property Office, the entire disclosure of which is incorporated herein by reference for all purposes.

BACKGROUND

1. Field

The disclosed embodiments relate to a technique for generating an HDR image.

2. Description of Related Art

High dynamic range (HDR) is a technique that extends a range of brightness from the brightest part to the darkest part of an image to reproduce what the human eye sees as closely as possible. However, in order to generate an HDR image, there are limitations such as the need to photograph with a device exclusive for HDR. In order to overcome this limitation, in some cases, many attempts have been made to implement the HDR image with a single low dynamic range (LDR) image. As a representative method among these attempts, a method for generating an HDR image by photographing the same scene with different exposures and merging a plurality of captured LDR images is introduced. However, this method requires complicated parameters, and there is a problem in that some of information of an original image is omitted in images captured with different exposures.

In order to solve such a problem, recently, a method for generating an HDR image using deep learning is being actively studied. According to recent research trends in HDR image generation technology, a method for generating an LDR image into an HDR image through deep learning, such as a method of creating the HDR image by inputting a single LDR image into a deep learning network, a method of implementing HDR by generating LDR images with different exposure values through deep learning and merging the LDR images, and a method of implementing the LDR image into the HDR image using only a deep learning network in an end-to-end scheme, is in the spotlight.

However, the technique that generates HDR images using deep learning also has a problem in that a range of brightness values of the generated HDR images is uneven. Therefore, although a prior art related to a technique for generating the HDR image using deep learning exists, there is still a need for an improved method for generating the HDR image.

PRIOR ART LITERATURE

Patent Literature

Patent Document 1: Korean registered patent publication No. 10-11926490 (registered on Dec. 3, 2018)

SUMMARY

The disclosed embodiments are intended to provide an apparatus and method for generating an HDR image.

According to an aspect of the disclosure, there is provided a method for generating an HDR image including generating, based on a brightness value of each pixel included in an original image, a first image including an area having the brightness value greater than or equal to a specific value in the original image and a second image including a remaining area except for the area having the brightness value greater than or equal to the specific value in the original image and generating a high dynamic range (HDR) in which a dynamic range of the original image is extended from the first image and the second image using a pre-trained model including a first neural network, a second neural network, and a third neural network, in which the first neural network is pre-trained to output a third image in which a range of the brightness value of the first image is extended in a direction in which the brightness value is increased based on the first image, the second neural network is pre-trained to output a fourth image in which a range of the brightness value of the second image is extended in a direction in which the brightness value is decreased based on the second image, and the third neural network is pre-trained to generate the HDR image based on the third image and the fourth image.

The generating of the first image and the second image may include generating a mask based on the brightness value of each pixel, generating the first image by masking the original image using the mask, and generating the second image by inverting brightness of the first image.

In the generating of the mask, the mask may be generated using Equation 1 below $$\text{mask}(i, j) = \left( \frac{\max\left(0, \frac{P(i, j) - \text{threshold}}{255}\right)}{1 - \frac{\text{threshold}}{255}} \right)^2 \quad \text{[Equation 1]}$$

(where $P(i,j)$ is a brightness value corresponding to $(i,j)$ pixel of the original image, and threshold is a threshold value determined based on the brightness value of each pixel).

The threshold value may be set based on an average brightness value of each pixel.

The first neural network may include a first convolution layer that outputs a first feature vector for the first image by performing a convolution operation on the first image and a first pooling layer that performs max pooling on the first feature vector, and the second neural network may include a second convolutional layer that outputs a second feature vector for the second image by performing the convolution operation on the second image and a second pooling layer that performs min pooling for the second feature vector.

The third neural network may be pre-trained to extract a third feature vector from a fifth image obtained by combining the third image and the fourth image and to generate the HDR image based on the extracted third feature vector.

The pre-trained model may further include a pre-trained fourth neural network to generate a feature vector for the original image by performing sub-sampling on the original image.

The first neural network may be pre-trained to extract a first feature vector for the first image and to generate the third image based on the first feature vector for the first image and the feature vector for the original image and the second neural network may be pre-trained to extract a second feature vector for the second image and to generate the fourth image based on the second feature vector for the second image and the feature vector for the original image.

The third neural network may be pre-trained to extract a third feature vector from a fifth image obtained by combining the third image and the fourth image and to generate the HDR image based on the third feature vector and the feature vector for the original image.

According to another aspect of the disclosure, there is provided an apparatus for generating an HDR image including an input image generator that generates, based on a brightness value of each pixel included in an original image, a first image including an area having the brightness value greater than or equal to a specific value in the original image and a second image including a remaining area except for the area having the brightness value greater than or equal to the specific value in the original image and an HDR image generator that generates a high dynamic range (HDR) in which a dynamic range of the original image is extended from the first image and the second image using a pre-trained model including a first neural network, a second neural network, and a third neural network, in which the first neural network is pre-trained to output a third image in which a range of the brightness value of the first image is extended in a direction in which the brightness value is increased based on the first image, the second neural network is pre-trained to output a fourth image in which a range of the brightness value of the second image is extended in a direction in which the brightness value is decreased based on the second image, and the third neural network is pre-trained to generate the HDR image based on the third image and the fourth image.

The input image generator may generate a mask based on the brightness value of each pixel, generate the first image by masking the original image using the mask, and generate the second image by inverting brightness of the first image.

The input image generator may generate the mask using Equation 1 below $$\text{mask}(i, j) = \left( \frac{\max\left(0, \frac{P(i, j) - \text{threshold}}{255}\right)}{1 - \frac{\text{threshold}}{255}} \right)^2 \quad \text{[Equation 1]}$$

(where P(i,j) is a brightness value corresponding to (i,j) pixel of the original image, and threshold is a threshold value determined based on the brightness value of each pixel).

The threshold value may be set based on an average brightness value of each pixel.

The first neural network may include a first convolution layer that outputs a first feature vector for the first image by performing a convolution operation on the first image and a first pooling layer that performs max pooling on the first feature vector, and the second neural network may include a second convolutional layer that outputs a second feature vector for the second image by performing the convolution operation on the second image and a second pooling layer that performs min pooling for the second feature vector.

The third neural network may be pre-trained to extract a third feature vector from a fifth image obtained by combining the third image and the fourth image and to generate the HDR image based on the extracted third feature vector.

The pre-trained model may further include a pre-trained fourth neural network to generate a feature vector for the original image by performing sub-sampling on the original image.

The first neural network may be pre-trained to extract a first feature vector for the first image and to generate the third image based on the first feature vector for the first image and the feature vector for the original image and the second neural network may be pre-trained to extract a second feature vector for the second image and to generate the fourth image based on the second feature vector for the second image and the feature vector for the original image.

The third neural network may be pre-trained to extract a third feature vector from a fifth image obtained by combining the third image and the fourth image and to generate the HDR image based on the third feature vector and the feature vector for the original image.

According to the disclosed embodiments, since the HDR image can be generated based on an image generated so that bright areas of the original image are brighter and dark areas are darker by using separately trained neural networks, the HDR image in which a range of brightness values is uniformly extended can be generated compared to the prior art.

DETAILED DESCRIPTION

Hereinafter, a specific embodiment will be described with reference to the drawings. The following detailed description is provided to aid in a comprehensive understanding of the methods, apparatus and/or systems described herein. However, this is illustrative only, and the present disclosure is not limited thereto.

In describing the embodiments, when it is determined that a detailed description of related known technologies related to the present disclosure may unnecessarily obscure the subject matter of an embodiment, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
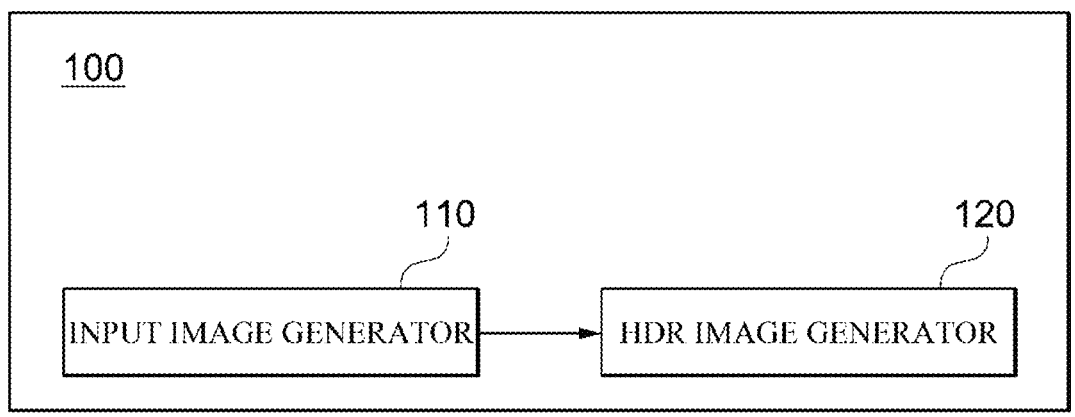
FIG. 1 is a block diagram illustrating an apparatus for generating an HDR image according to an embodiment.

FIG. 1 is a block diagram illustrating an apparatus 100 for generating an HDR image according to an embodiment.

Referring to FIG. 1, the apparatus 100 for generating the HDR image according to an embodiment includes an input image generator 110 and an HDR image generator 120.

In the illustrated embodiment, each of the components may have different functions and capabilities other than those described below, and may include additional components in addition to those described below.

Also, in the following embodiment, the input image generator 110 and the HDR image generator 120 may be implemented using one or more physically separated devices, or may be implemented by one or more processors or a combination of one or more processors and software, and may not be clearly distinguished in specific operation unlike the illustrated example.

The input image generator 110 generates, based on a brightness value of each pixel included in an original image 201, a first image 203 including an area having the brightness value greater than or equal to a specific value in the original image 201 and a second image 205 including a remaining area except for the area having the brightness value greater than or equal to the specific value in the original image 201.

Figure 2:
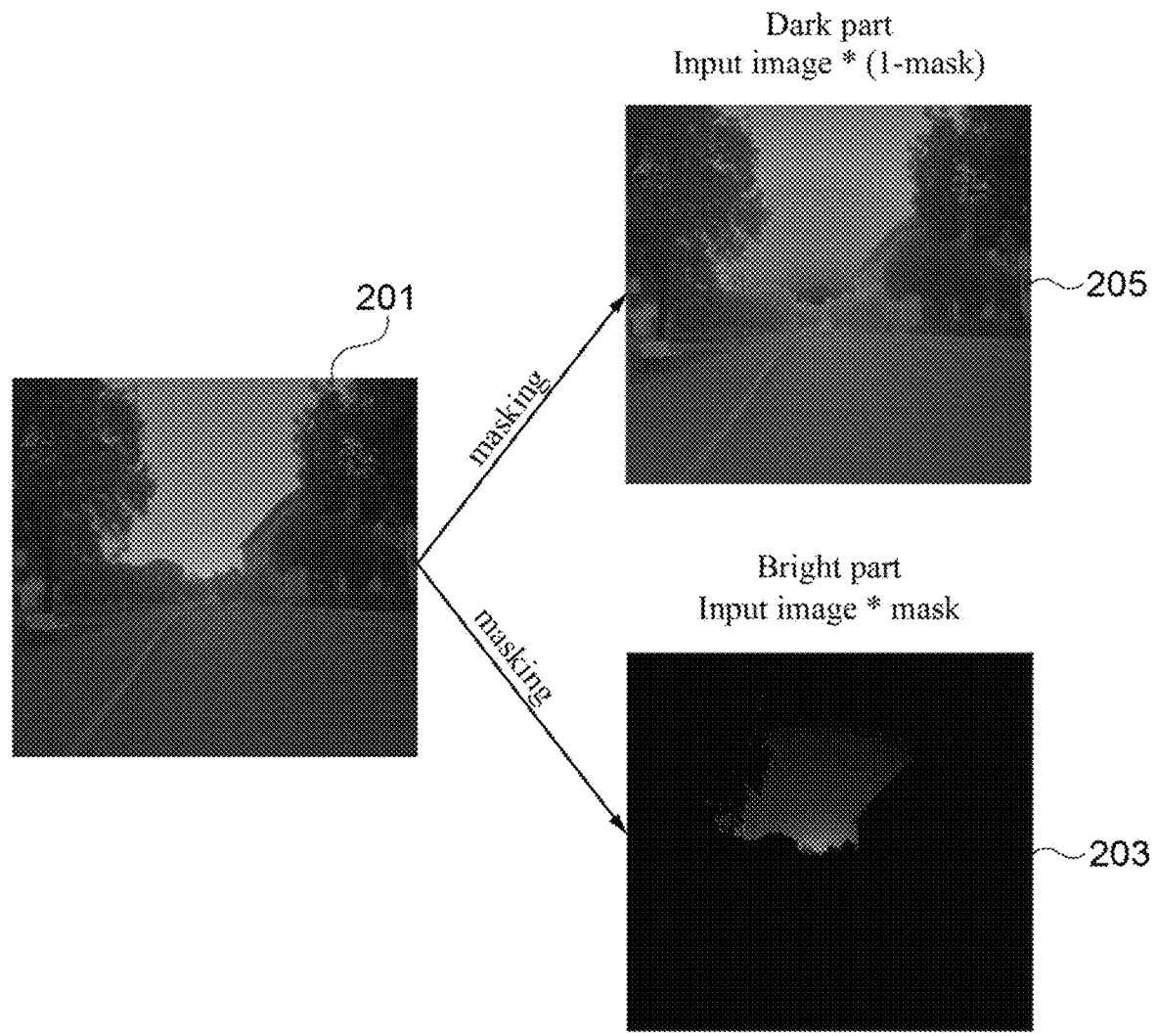
FIG. 2 is a diagram for describing a process of generating a first image and a second image by an input image generator according to an embodiment.

FIG. 2 is a diagram for describing a process of generating the first image 203 and the second image 205 by the input image generator 110 according to an embodiment.

Referring to FIG. 2, the input image generator 110 according to an embodiment can generate the first image 203 and the second image 205 by masking the original image 201.

In the apparatus 100 for generating the HDR image according to an embodiment, a bright area of the original image 201 may be used in a first neural network 310, and a dark area of the original image 201 may be used in a second neural network 320.

That is, the apparatus 100 for generating the HDR image needs to preliminarily distinguish a relatively bright area and a dark area of the original image 201 before generating the HDR image.

Therefore, the input image generator 110 according to an embodiment may use a masking technique as a method for distinguishing the bright area from the dark area of the original image 201 as illustrated in FIG. 2.

Specifically, the input image generator 110 according to an embodiment can generate a mask based on the brightness value of each pixel of the original image 201, generate the first image 203 by masking the original image 201 using the mask, and generate the second image 205 by inverting brightness of the first image 203.

However, the input image generator 110 according to an embodiment can generate the first image 203 using a calculated mask.

Considering this, the input image generator 110 can generate the second image 205 that is a relatively dark area of the original image 201 by masking the original image 201 using (1-mask) with the same concept.

According to an embodiment, in this case, the mask may be generated using Equation 1 below.

$$\text{mask}(i, j) = \left( \frac{\max\left(0, \frac{P(i, j) - \text{threshold}}{255}\right)}{1 - \frac{\text{threshold}}{255}} \right)^2 \quad \text{[Equation 1]}$$

In this case, P(i,j) indicates a brightness value corresponding to (i,j) pixel of the original image, and threshold indicates a threshold value determined based on the brightness value of each pixel).

According to an embodiment, in order for the input image generator 110 to generate the first image 203 and the second image 205 in consideration of the characteristics of the original image 201, the threshold value of the mask can be set based on an average brightness value of each pixel of the original image 201.

Specifically, the threshold value can be adjusted by adding the average brightness value of each pixel of the original image 201 and a preset parameter value.

Meanwhile, the input image generator 110 according to an embodiment can generate the first image 203 and the second image 205 having smooth boundaries by using the calculated mask compared to the prior art related to image segmentation.

Figure 3:
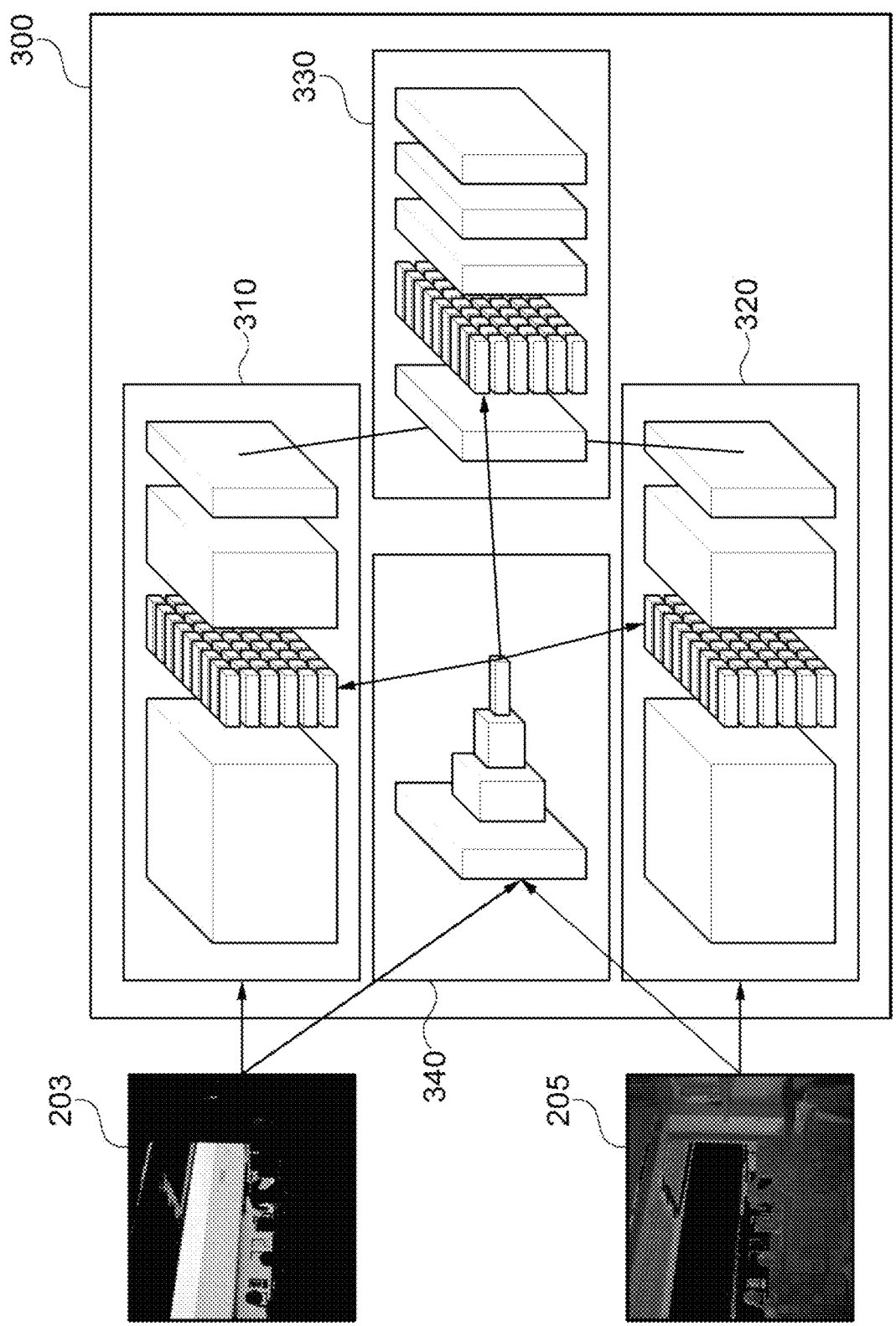
FIG. 3 is a diagram for describing a structure of a pre-trained model according to an embodiment.

FIG. 3 is a diagram for describing a structure of a pre-trained model 300 according to an embodiment.

The pre-trained model 300 includes a first neural network 310, a second neural network 320, and a third neural network 330.

However, as illustrated in FIG. 3, the pre-trained model 300 according to an embodiment can include the first neural network 310, the second neural network 320, the third neural network 330, and a fourth neural network 340.

Meanwhile, the HDR image generator 120 generates an HDR image using the pre-trained model 300.

Specifically, the HDR image generator 120 generates a high dynamic range (HDR) image in which a dynamic range of the original image 201 is extended from the first image 203 and the second image 205 using the pre-trained model 300 including the first neural network 310, the second neural network 320, and the third neural network 330.

In this case, the first neural network 310 is pre-trained to output a third image in which a range of the brightness value of the first image 203 is extended in a direction in which the brightness value is increased based on the first image 203.

The second neural network 320 is pre-trained to output a fourth image in which a range of the brightness value of the second image 205 is extended in a direction in which the brightness value is decreased based on the second image 205.

The third neural network 330 is pre-trained to generate the HDR image based on the third image and the fourth image.

According to an embodiment, the third neural network 330 can be pre-trained to extract a third feature vector from a fifth image obtained by combining the third image and the fourth image and to generate the HDR image based on the extracted third feature vector.

According to an embodiment, the fourth neural network 340 can be pre-trained network to generate a feature vector for the original image 201 by performing sub-sampling on the original image 201.

Specifically, the first neural network 310 can be pre-trained to extract the first feature vector for the first image 203 and to generate the third image based on the first feature vector for the first image 203 and the feature vector for the original image 201.

The second neural network 320 can be pre-trained to extract the second feature vector for the second image 205 and to generate the fourth image based on the second feature vector for the second image and the feature vector for the original image 201.

That is, the first neural network 310 and the second neural network 320 may be pre-trained to generate the third image and the fourth image in consideration of the feature vector for the original image 201.

Through this, the first neural network 310 and the second neural network 320 can prevent the properties of the original image 201 from being omitted in the output third image and fourth image.

In addition, according to an embodiment, the first neural network 310 can include a first convolution layer that outputs the first feature vector for the first image 203 by performing a convolution operation on the first image 203 and a first pooling layer that performs max pooling on the first feature vector.

According to an embodiment, the second neural network can include a second convolutional layer that outputs the second feature vector for the second image 205 by performing the convolution operation on the second image 205 and a second pooling layer that performs min pooling for the second feature vector.

That is, the first neural network 310 can be pre-trained to output the first feature vector through the first convolutional layer and to output the third image in which the range of the brightness value of the first image 203 is extended in a direction in which the brightness value of the first image 203 is increased by the first pooling layer that performs maximum pooling on element values of the output first feature vector.

Similarly, the second neural network 320 can be pre-trained to output the second feature vector through the second convolutional layer and to output the fourth image in which the range of the brightness value of the second image 205 is extended in a direction in which the brightness value of the second image 205 is decreased by the second pooling layer that performs minimum pooling on element values of the output second feature vector.

That is, the HDR image generator 120 according to an embodiment can generate the HDR image, based on the third image in which the brightness range is extended in a direction in which the brightness value of the bright area of the original image 201 is increased through the first neural network 310 and the fourth image in which the brightness range of the original image 201 is extended in the direction in which the brightness value of the dark area is decreased, in order to generate an HDR image having a wider range of brightness compared to the prior art.

Here, extending the range of brightness of the first image 203 and the second image 205 may mean that a bright portion of the first image 203 is changed to become brighter and a dark portion of the second image 205 is changed to become darker.

Figure 4:
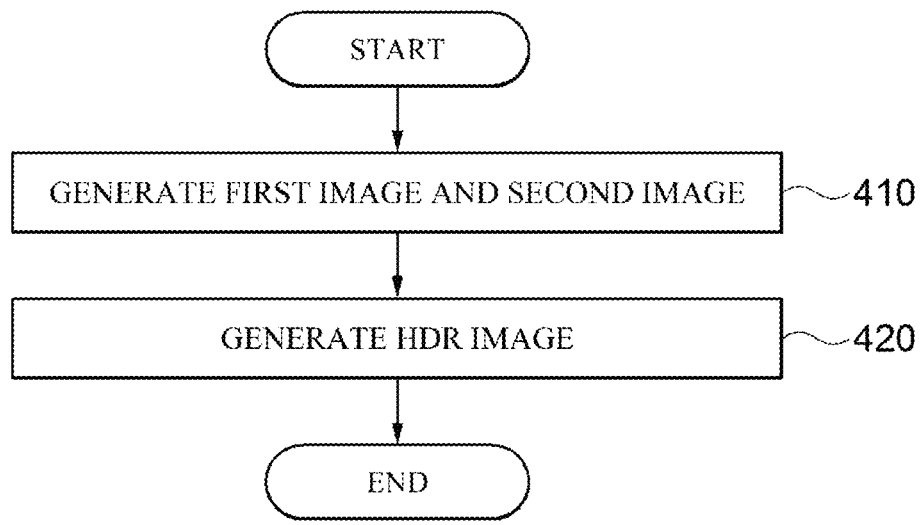
FIG. 4 is a flowchart illustrating a method for generating an HDR image according to an embodiment.

FIG. 4 is a flowchart illustrating a method for generating an HDR image according to an embodiment.

The method illustrated in FIG. 4 can be performed by the apparatus 100 for generating the HDR image illustrated in FIG. 1.

Referring to FIG. 4, the apparatus 100 for generating the HDR image generates, based on a brightness value of each pixel included in the original image 201, the first image 203 including the area having the brightness value greater than or equal to a specific value in the original image 201 and the second image 205 including a remaining region except for the area having the brightness value greater than or equal to the specific value in the original image 201 (410).

Thereafter, the apparatus 100 for generating the HDR image generates a high dynamic range (HDR) in which a dynamic range of the original image 201 is extended from the first image 203 and the second image 205 using the pre-trained model 300 including the first neural network 310, the second neural network 320, and the third neural network 330 (420).

In this case, the first neural network 310 is pre-trained to output the third image in which the range of the brightness value of the first image 203 is extended in a direction in which the brightness value is increased based on the first image 203.

The second neural network 320 is pre-trained to output the fourth image in which the range of the brightness value of the second image 205 is extended in a direction in which the brightness value is decreased based on the second image 205.

The third neural network 330 is pre-trained to generate the HDR image based on the third image and the fourth image.

In FIG. 4 illustrated above, the method described above has been described by dividing the method into a plurality of steps, but at least some of the steps may be performed in a different order, performed in combination with other steps, or omitted, performed by being divided into detailed steps, or performed by being added with one or more steps (not illustrated).

Figure 5:
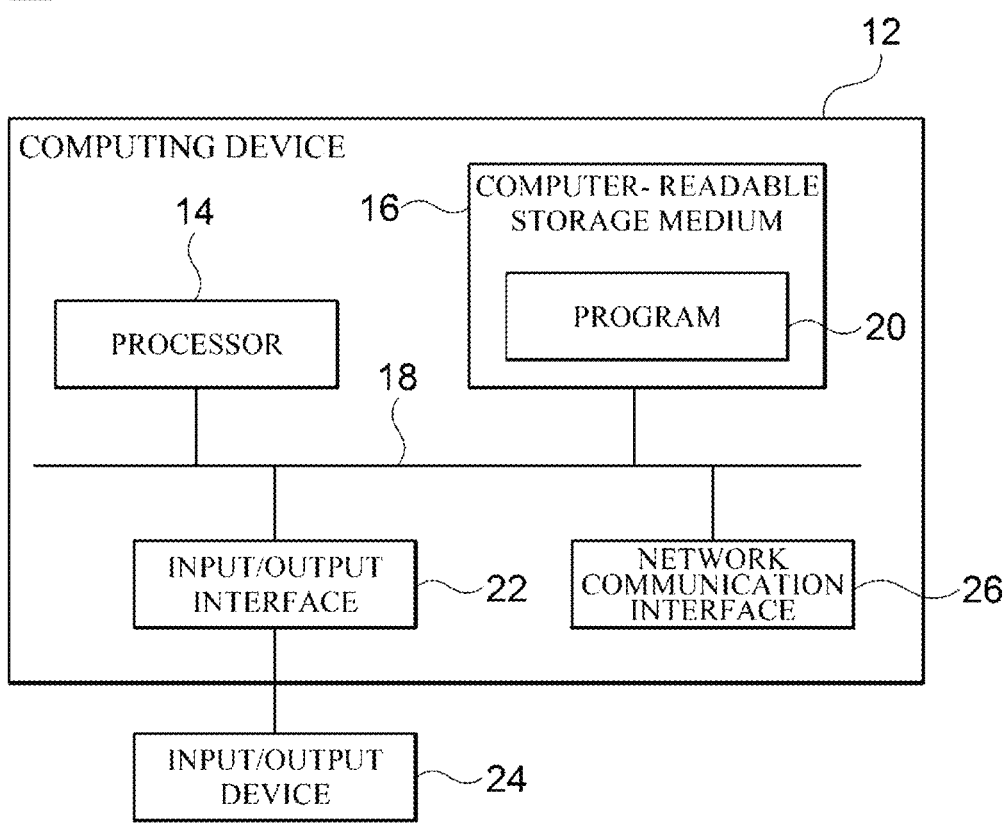
FIG. 5 is a block diagram illustratively describing a computing environment including a computing device according to an embodiment.

FIG. 5 is a block diagram illustratively describing a computing environment including a computing device 12 according to an embodiment. In the illustrated embodiment, respective components may have different functions and capabilities other than those described below, and may include additional components in addition to those described below.

The illustrated computing environment 10 includes the computing device 12. In an embodiment, the computing device 12 may be one or more components included in the apparatus 100 for generating the HDR image.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present disclosure has been described in detail through representative examples above, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents of the claims.

What is claimed is:

1. A method for generating an HDR image comprising:
generating, based on a brightness value of each pixel included in an original image, a first image including an area having the brightness value greater than or equal to a specific value in s the original image and a second image including a remaining area except for the area having the brightness value greater than or equal to the specific value in the original image; and
generating a high dynamic range (HDR) in which a dynamic range of the original image is extended from the first image and the second image using a pre-trained model including a first neural network, a second neural network, and a third neural network,
wherein the first neural network is pre-trained to output a third image in which a range of the brightness value of the first image is extended in a direction in which the brightness value is increased based on the first image,
the second neural network is pre-trained to output a fourth image in which a range of the brightness value of the second image is extended in a direction in which the brightness value is decreased based on the second image, and
the third neural network is pre-trained to generate the HDR image based on the third image and the fourth image,
wherein the generating of the first image and the second image includes:
generating a mask based on the brightness value of each pixel,
generating the first image by masking the original image using the mask, and
generating the second image by inverting brightness of the first image, and
wherein in the generating of the mask, the mask is generated using Equation 1 below, $$\text{mask}(i, j) = \left( \frac{\max\left(0, \frac{P(i, j) - \text{threshold}}{255}\right)}{1 - \frac{\text{threshold}}{255}} \right)^2 \quad \text{[Equation 1]}$$

where P(i,j) is a brightness value corresponding to (i, j) pixel of the original image, and threshold is a threshold value determined based on the brightness value of each pixel.

2. The method of claim 1, wherein the threshold value is set based on an average brightness value of each pixel.

3. The method of claim 1, wherein the first neural network includes a first convolution layer that outputs a first feature vector for the first image by performing a convolution operation on the first image and a first pooling layer that performs max pooling on the first feature vector, and
the second neural network includes a second convolutional layer that outputs a second feature vector for the second image by performing the convolution operation on the second image, and a second pooling layer that performs min pooling for the second feature vector.

4. The method of claim 1, wherein the third neural network is pre-trained to extract a third feature vector from a fifth image obtained by combining the third image and the fourth image, and to generate the HDR image based on the extracted third feature vector.

5. The method of claim 1, wherein the pre-trained model further includes a pre-trained fourth neural network to generate a feature vector for the original image by performing sub-sampling on the original image.

6. The method of claim 5, wherein the first neural network is pre-trained to extract a first feature vector for the first image and to generate the third image based on the first feature vector for the first image and the feature vector for the original image and
the second neural network is pre-trained to extract a second feature vector for the second image and to generate the fourth image based on the second feature vector for the second image and the feature vector for the original image.

7. The method of claim 5, wherein the third neural network is pre-trained to extract a third feature vector from a fifth image obtained by combining the third image and the fourth is image and to generate the HDR image based on the third feature vector and the feature vector for the original image.

8. An apparatus for generating an HDR image comprising:
and input image generator that generates, based on a brightness value of each pixel included in an original image, a first image including an area having the brightness value greater than or equal to a specific value in the original image and a second image including a remaining area except for the area having the brightness value greater than or equal to the specific value in the original image; and
an HDR image generator that generates a high dynamic range (HDR) in which a dynamic range of the original image is extended from the first image and the second image using a pre-trained model including a first neural network, a second neural network, and a third neural network,
wherein the first neural network is pre-trained to output a third image in which a range of the brightness value of the first image is extended in a direction in which the brightness value is increased based on the first image,
the second neural network is pre-trained to output a fourth image in which a range of the brightness value of the second image is extended in a direction in which the brightness value is decreased based on the second image, and
the third neural network is pre-trained to generate the HDR image based on the third image and the fourth image,
wherein the input generator generates a mask based on the brightness value of each pixel, generate the first image by masking the original image using the mask, and generate the second image by inverting brightness of the first image, and wherein the input image generator generates the mask using Equation 1 below, $$\text{mask}(i, j) = \left( \frac{\max\left(0, \frac{P(i, j) - \text{threshold}}{255}\right)}{1 - \frac{\text{threshold}}{255}} \right)^2 \quad \text{[Equation 1]}$$

where P(i,j) is a brightness value corresponding to (i, j) pixel of the original image, and threshold is a threshold value determined based on the brightness value of each pixel.

9. The apparatus of claim 8, wherein the threshold value is set based on an average brightness value of each pixel.

10. The apparatus of claim 8, wherein the first neural network includes a first convolution layer that outputs a first feature vector for the first image by performing a convolution operation on the first image and a first pooling layer that performs max pooling on the first feature vector, and the second neural network includes a second convolutional layer that outputs a second feature vector for the second image by performing the convolution operation on the second image, and a second pooling layer that performs min pooling for the second feature vector.

11. The apparatus of claim 8, wherein the third neural network is pre-trained to extract a third feature vector from a fifth image obtained by combining the third image and the fourth image, and to generate the HDR image based on the extracted third feature vector.

12. The apparatus of claim 8, wherein the pre-trained model further includes a pre-trained fourth neural network to generate a feature vector for the original image by performing sub-sampling on the original image.

13. The apparatus of claim 12, wherein the first neural network is pre-trained to extract a first feature vector for the first image and to generate the third image based on the first feature vector and the feature vector for the original image, and the second neural network is pre-trained to extract a second feature vector for the second image and to generate the fourth image based on the second feature vector and the feature vector for the original image.

14. The apparatus of claim 12, wherein the third neural network is pre-trained to extract a third feature vector from a fifth image obtained by combining the third image and the fourth image and to generate the HDR image based on the third feature vector and the feature vector for the original image.

* * * * *